UNITED STATES PATENT OFFICE.

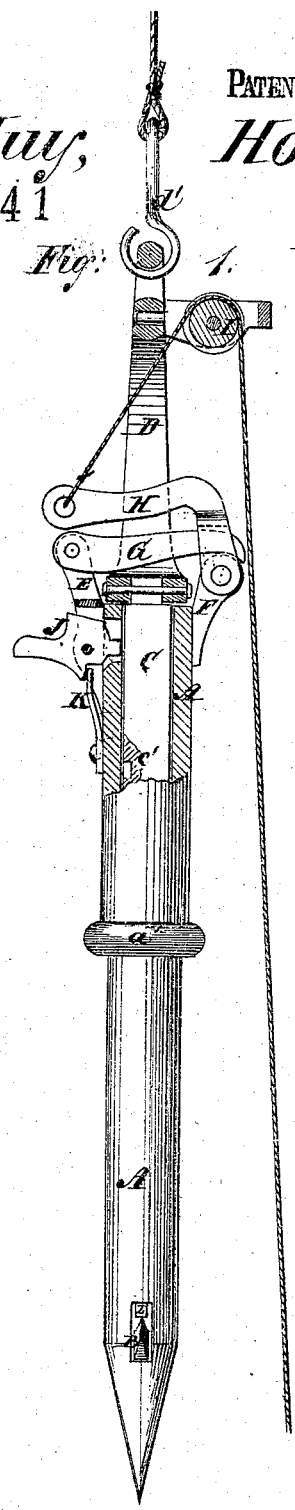
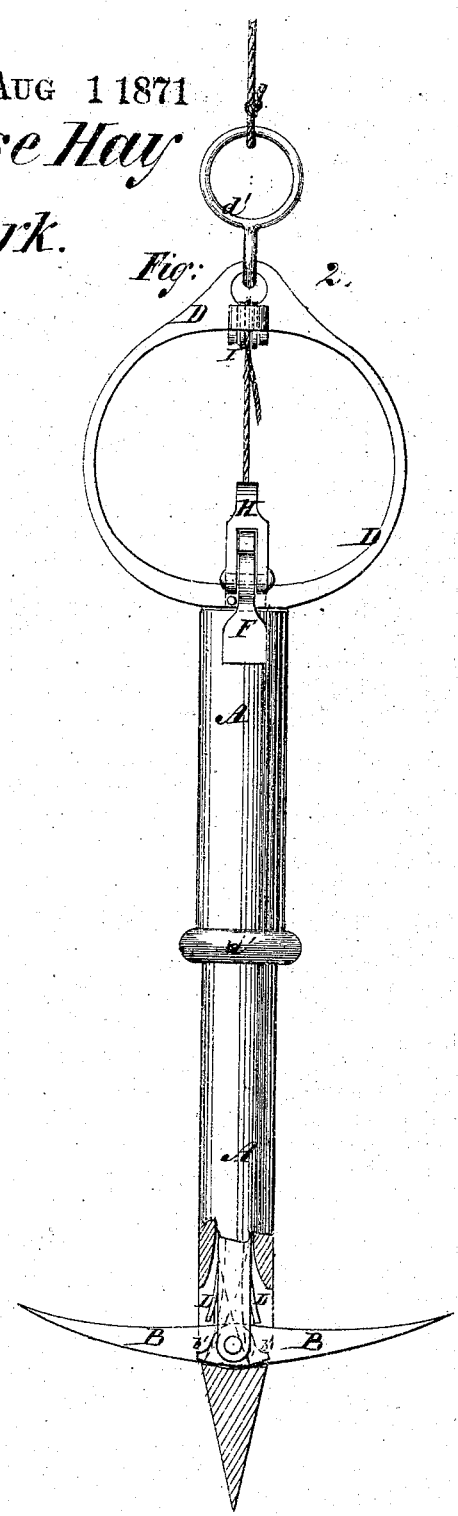

JACOB HUY, OF BAKERSTOWN, PENNSYLVANIA.

IMPROVEMENT IN HORSE HAY-FORKS.

Specification forming part of Letters Patent No. 117,541, dated August 1, 1871.

*To all whom it may concern:*

Be it known that I, JACOB HUY, of Bakerstown, in the county of Allegheny and State of Pennsylvania, have invented a new and useful Improvement in Horse Hay-Fork; and I do hereby declare that the following is a full, clear, and exact description thereof, which will enable others skilled in the art to make and use the same, reference being had to the accompanying drawing forming part of this specification, in which—

Figure 1 is a side view of my improved fork, partly in section, to show the construction. Fig. 2 is a rear view of the same; partly in section, to show the construction.

Similar letters of reference indicate corresponding parts.

My invention consists in improving horse hay-forks, as hereinafter fully described and subsequently pointed out in the claim.

A is a pipe or tube, the lower end of which is made solid, and pointed so that it may readily enter the hay. In the opposite sides of the lower part of the tube A are formed holes or slots, through which the prongs B of the fork are projected to support the hay, and through which the said prongs are withdrawn to discharge the hay when it has been transported to the desired place. The inner ends of the prongs B are pivoted to the lower end of the rod C, which passes down through the tube A, and to the upper end of which is attached, or upon it is formed, a loop, ring, or handle, D, to the upper part of which is pivoted a link or ring, $d$, to which is attached the end of the hoisting-rope. To the opposite sides of the upper end of the tube A, and at right angles with the plane of the loop or ring D, are attached, or upon it are formed, lugs E F. To the lug E is pivoted one end of an arm, G, the other or free end of which enters a slot in the base of the arm H, pivoted to the other lug F. The arm H is bent nearly at right angles, as shown in Fig. 1, so that it may be turned down over the arm G to lock the said arm, and thus hold the prongs B projected. The upper side of the free end of the arm G is beveled off, so that it may readily slip out of the slot in the arm H to unlock the fork and discharge the hay, when the said arm H is raised by pulling upon the trip-cord which is attached to its free end, and which passes over a guide-pulley, I, pivoted to the upper part of the loop or ring D, as shown in Figs. 1 and 2. J is a thumb-catch, which is pivoted to the side of the upper part of the tube A, and which passes through a slot in the said tube and rests against the side of the rod C, so that when the prongs B are drawn into the tube A the said catch may be forced into a hole in the rod C to lock the said rod in position, with the prongs B drawn in to prevent the said prongs from being forced out by the operation of forcing the fork down into the hay. The catch J is pressed and held against the rod C in position to enter the hole $c'$ in said rod by the spring K attached to the side of the tube A, and which presses against a shoulder formed upon the said catch. $a'$ is a ring or collar formed upon or attached to the tube A, to serve as a stop to the tube A when pressed into the hay, to stop the said tube sufficiently to allow the prongs B to be forced out when the spring-catch J K has been withdrawn from the hole $c'$ in the bar or rod C. The points of the prongs B are caused to project through the holes in the tube A by the springs L attached to the rod C, and which are compressed as the prongs B are drawn inward by shoulders $b$ formed upon the inner ends of the said prongs, and which are forced against the ends of the said springs as the said prongs are drawn inward by the upward movement of the rod or bar C, the elasticity of the springs L thus forcing the free end of the prongs outward as the rod C moves downward.

Having thus described my invention, I claim as new and desire to secure by Letters Patent—

1. The combination of tube A, rod C, springs L, and shouldered prongs B $b'$, when arranged for joint operation, substantially as specified.

2. An improved hay-fork, consisting of the pointed tube A, pivoted prongs B $b'$, rod C, loop or ring D, pivoted lock and trip-arms G H, spring-catch J K, and springs L, said parts being combined and operating in connection with each other, substantially as herein shown and described.

JACOB HUY.

Witnesses:
SAMUEL T. FULTON,
JOSEPH HENRY.